United States Patent
Hyndman et al.

(10) Patent No.: US 8,832,782 B2
(45) Date of Patent: Sep. 9, 2014

(54) SINGLE SIGN-ON SYSTEM AND METHOD

(71) Applicant: Avaya Inc., Basking Ridge, NJ (US)

(72) Inventors: Arn C. Hyndman, Ottawa (CA); Albert F. Reiche, Kanata (CA); Christopher Hatko, Gatineau (CA)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/630,979

(22) Filed: Sep. 28, 2012

(65) Prior Publication Data

US 2014/0068702 A1  Mar. 6, 2014

Related U.S. Application Data

(60) Provisional application No. 61/695,936, filed on Aug. 31, 2012.

(51) Int. Cl.
*G06F 17/00* (2006.01)
*H04L 29/06* (2006.01)

(52) U.S. Cl.
USPC .......................................................... 726/1

(58) Field of Classification Search
CPC .................................. G06F 21/42; G06F 21/41
USPC ................................................................ 726/1
See application file for complete search history.

(56) References Cited

U.S. PATENT DOCUMENTS

| | | | |
|---|---|---|---|
| 7,221,935 B2 * | 5/2007 | Barriga-Caceres et al. | 455/414.1 |
| 8,370,914 B2 * | 2/2013 | Dalzell et al. | 726/9 |
| 2006/0230438 A1 * | 10/2006 | Shappir et al. | 726/8 |
| 2012/0198512 A1 * | 8/2012 | Zhou et al. | 726/1 |

* cited by examiner

*Primary Examiner* — Dant Shaifer Harriman (57) ABSTRACT

A computer-readable storage medium having computer-executable instructions for authenticating in a computing environment where the computer-executable instructions instruct a processor to receive a token from a client by a first process, send the token to a second process, validate the token by the second process by sending the token to a policy server and receiving a validation of the token from the policy server, and selectively grant access to the computing resource based at least in part upon the validation of the token. The validation of the token indicates that the token is associated with a previous successful authentication of the client by the second process. A system also includes the first process and the second process.

7 Claims, 6 Drawing Sheets

SINGLE SIGN-ON SYSTEM AND METHOD

REFERENCE TO RELATED APPLICATIONS

This application claims priority to U.S. Provisional Patent Application No. 61/695,936, filed Aug. 31, 2012.

TECHNICAL FIELD

The systems and methods described below relate generally to the field of authenticating computer systems. More particularly, the systems and methods relate to granting access to computing resources using a single sign-on computing system.

SUMMARY

A first method of authenticating in a computing environment includes receiving a token from a client by a first process, sending the token to a second process, validating the token by the second process by sending the token to a policy server and receiving a validation of the token from the policy server, and selectively granting access to the computing resource based at least in part upon the validation of the token. The validation of the token indicates that the token is associated with a previous successful authentication of the client by the second process. The operation of sending the token to the second process can include sending a cookie that includes the token. The method can include using a secure communications channel when sending the token to the second process or the policy server. The operation of validating can further include sending a user ID, a user group, a first name, or a last name to the policy server. The first process and the second process can be processes of an application server. The policy server can be a single sign-on (SSO) server. The method can further include authenticating credentials that are received from the client by the second process by sending the credentials to the policy server and receiving a token from the policy server that indicates a successful authentication of the credentials. The method can further include sending the token to the client from the second process and sending a launch page to the client, where the launch page is associated with the first process. The operation of sending the token to the client can include sending a cookie that includes the token. The method can further include receiving the token by the client and passing the token as parameter data to a plug-in that is associated with the first process.

A second method of authenticating in a computing environment includes sending credentials for authentication to a host server, receiving a token associated with a successful authentication of the credentials by a policy server from the host server, sending the token to a helper process that sends the token to an application, and receiving access to computing resources related to the application based on a successful validation of the token by the policy server. The successful validation of the token can be accomplished by operations performed on the host server. The operations can include receiving the token from the application, sending a token, a token and a user ID, a token and a user group, a token and a first name, or a token and a last name to the policy server, and receiving a validation of the token from the policy server. The validation of the token can indicate that the token is associated with the successful authentication of the credentials. The method can include receiving a launch page from the host server where the launch page is associated with the application. The method can include receiving a script for sending the token as parameter data to a helper process. The method can include using the script to perform the operation of sending the token as parameter data to a helper process.

A system for authenticating in a computing environment includes a first process configured to receive a token from a client, send the token to a second process for validation, and selectively grant access to a computing resource based at least in part on a successful validation of the token by the second process. The second process is configured to receive the token from the first process, and validate the token. The second process validates the token by sending the token to a policy server, and receiving a validation of the token from the policy server that indicates that the token is associated with a previous successful authentication of the client by the second process. The first process can be configured to send a cookie to the second process where the cookie includes the token. The system can include a secure communications channel and the secure communications channel can be configure to facilitate secure communications between the second process and the first process or the second process and the policy server. The second process can be configured to send a user ID, a user group, a first name, or a last name to the policy server. The system can further include an application server and the first process and second process can be processes of the application service. The system can further include a policy server and the policy server can be a single sign-on (SSO) server. The second process can be configured to authenticate credentials received from the client by sending the credentials to the policy server and receiving a token from the policy server that indicates a successful authentication of the credentials. The second process can be configured to send the token to the client and send a launch page to the client, where the launch page is associated with the first process. The second process can be configured to send a cookie to the client where the cookie includes the token. The system can include a client configured to receive the token from the second process, send the token to the helper process as parameter data, and run the helper process. The helper process can be configured to receive the token as parameter data and send the token to the first process. The helper process can be a plug-in associated with the first process. The helper can be configured to run on the client.

DETAILED DESCRIPTION

The apparatuses, devices, systems and methods disclosed and described in this document can be used to manage of control access to computing resources using single sign-on systems. Those of ordinary skill in this art area will recognize from reading this description that the apparatuses, devices, methods, and systems described can be applied to, or easily modified for use with, other types of equipment, other arrangements of computing systems such as client-server, peer-to-peer, or distributed systems, other protocols, and at other layers in communication protocol stacks.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term software is used expansively to include not only executable code, but also data structures, data stores and computing instructions in any electronic format, firmware, and embedded software. The terms information and data are used expansively and includes a wide variety of electronic information, including but not limited to machine-executable or machine-interpretable instructions; content such as text, video data, and audio data, among others; and various codes or flags. The terms information, data, and content are sometimes used interchangeably when permitted by context. It should be noted that although for clarity and to aid in understanding some examples discussed below might describe specific features or functions as part of a specific component or module, or as occurring at a specific layer of a computing device (for example, a hardware layer, operating system layer, or application layer), those features or functions may be implemented as part of a different component or module or at a different layer.

The examples discussed below are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

When access to software application requires a user to log in using credentials such as a username and password, single sign-on can be desirable as it reduces the need for the users to separately enter credentials for each application they use. Using a single sign-on can also reduce the burden placed on users to manage different user identifications, or "user IDs", and different passwords and password policies implemented by each application. Further, single sign-on can reduce the overhead for administrators as only a single account need be created and managed for a user, instead of individual user accounts for each application.

The single sign-on system disclosed herein can reduce the complexity and costs associated with implementing single sign-on by performing the validation of a user's token through the host process that had previously authenticated the user's credentials with the policy server and received the token. Other applications that need to validate the user's token in the single sign-on system forward the user's token to the host process for validation, rather than performing the validation of the token directly with the policy server. Because the host process is on the same computing platform that originally authenticated the user, this single sign-on system avoids any potential firewall issues between third party applications and the policy server. For example, a policy server for a particular enterprise can be placed behind a firewall that prevents outside third parties from directly communicating with the policy server.

Many enterprises place their policy servers behind firewalls to prevent exposure of their security internal processes to outside third parties. However, this practice makes it difficult or impractical for third party applications to implement single sign-on. Also, applications that are hosted by remote networked computers can similarly be blocked by firewalls or rejected by the policy server. For example, an application hosted by remote networked computers can be, at times, from a different domain than expected by a policy server and the token can therefore be rejected by the policy server on that basis. Using the disclosed single sign-on system, the policy server receives both the initial authentication of the client and later validations of client tokens from the same domain, namely the domain of the host process. Performing the initial authentication of the client and later validations of client tokens by the same host process thus ensures that there will be a viable communication path to the policy server, independent of whether the application is a native application in the enterprise environment, a web application of a third party, or an application that is hosted by remote networked computers.

Figure 1A:
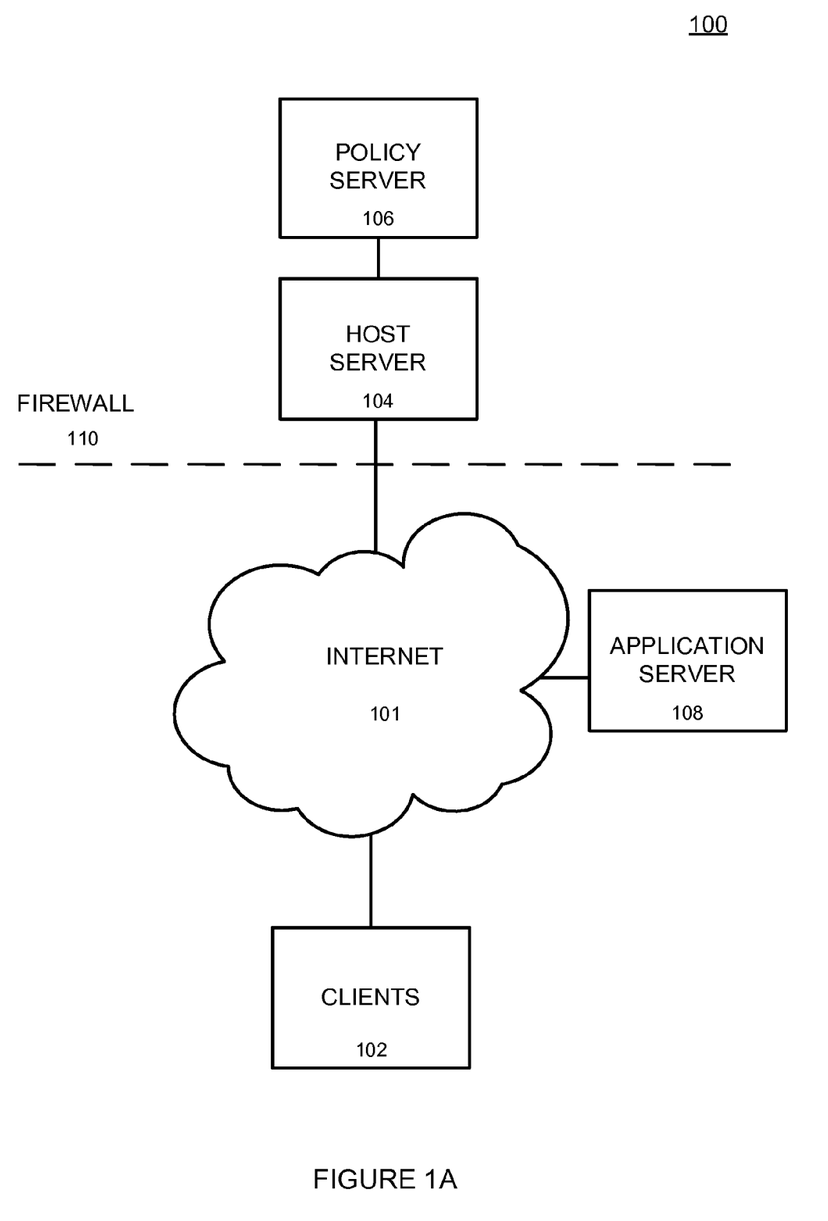
FIG. 1A is a block diagram of a network.

FIG. 1A is a block diagram of a single sign-on system, or SSO system 100. The SSO system 100 includes a computer 102, a host server 104, a policy server 106, and an application server 108. The computer 102, host server 104, policy server 106, and application server 108 communicate over a network 101. The network 101 can be a suitable communication network, including but not limited to the Internet, an intranet, a private network, a public switched telephone network, a cellular network, or a combination of networks. Example networks 101 can include a circuit-switched network, an asynchronous transfer mode (ATM) network, a packet-switched network running the TCP/IP suite of protocols, a cellular network using code division multiple access (CDMA or CDMA:2000), global system for mobile communications (GSM), or one of the 3G protocols, a wireless network running one or more of the IEEE 802.11x family of protocols, or another suitable network, including networks running on protocols currently in development or yet to be developed.

Figure 1B:
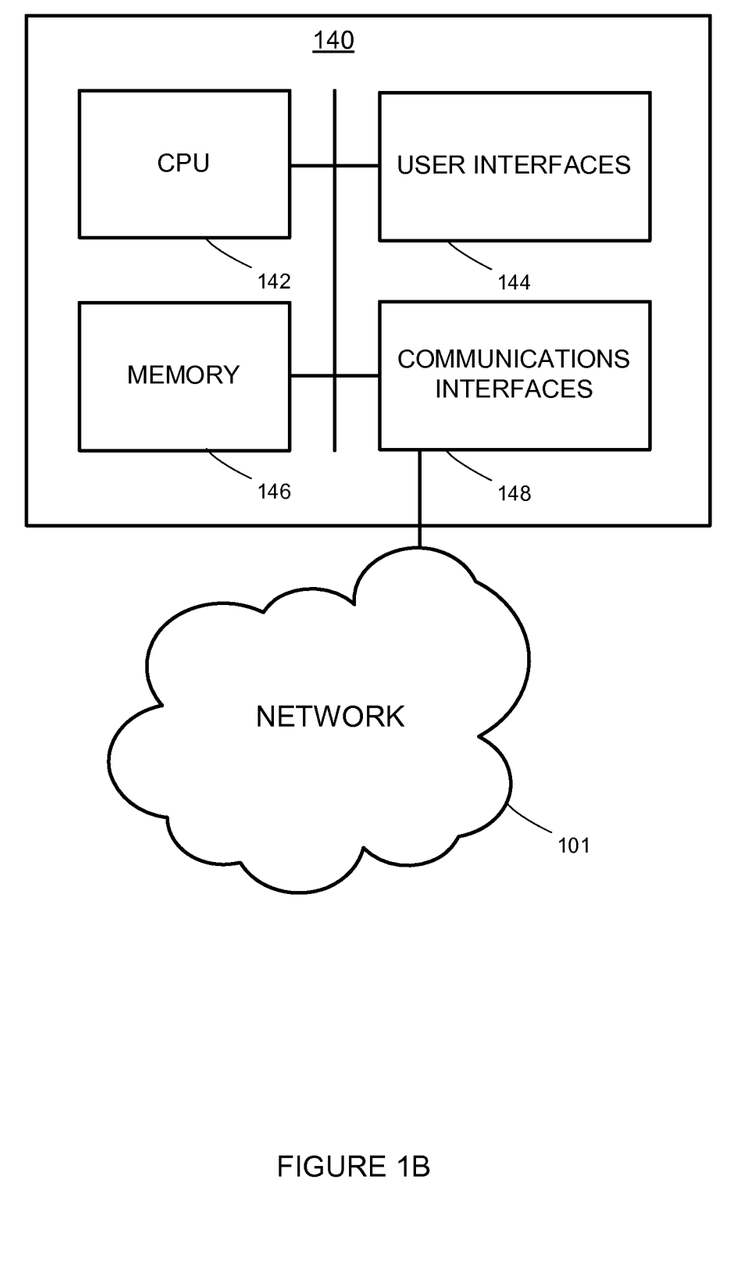
FIG. 1B is a block diagram of a computing platform.

The computer 102 can run client processes such as a host client 103 and an application client 107. A client process can be a browser or dedicated application running on a common computing platform such as the computer 102. The host client 103 and the application client 107 can also run on different computing platforms. An example computing platform 140 is illustrated in FIG. 1B. A computing platform 140 can include one or more central processing units (CPUs) or processors 142, one or more user interfaces 144, one or more memories 146, and one or more communications interfaces 148 that allow communications to other computing platforms 140 over a network 101. A processor 142 can be any suitable type of processing unit, for example a reduced instruction set computer (RISC), a processor that has a pipeline or multiple processing capability, a complex instruction set computer (CISC), a digital signal processor (DSP), an application specific integrated circuits (ASIC), a programmable logic devices (PLD), and a field programmable gate array (FPGA), among others. A user interface 144 can be a display, a keyboard or keypad, a mouse, a touchscreen, and trackball, an audio unit, a voice recognition unit, or any other suitable user interface. A memory 146 can be a random access memory (RAM) (such as dynamic RAM (DRAM) or static RAM (SRAM)), a read only memory (ROM), flash memory, a removable memory card or disk, a solid state drive, a hard drive, a floppy drive, a compact disk, a Compact Disk Read Only Memory (CD-ROM), a Compact Disk Recordable (CD-R), a Compact Disk Rewriteable (CD-RW), a type of Digital Versatile Disk (DVD) or BluRay disk, an optical disk, a magnetic media, magneto-optical media, or any other suitable memory. The memory 146 can store data and computing instructions including source code, compiled code, interpreted code, executable code, static code, dynamic code, encrypted code, or any other suitable type of code or computer instructions implemented using any suitable high-level, low-level, object-oriented, visual, compiled, or interpreted programming language. A communications interface 148 can be an Ethernet interface, a radio interface, a telephony interface, a Universal Serial Bus (USB) interface, or any other suitable communications interface. The network 101 can be an intranet, the Internet, a telephone network, a cable network, a wireless network, a packet-switched network, a circuit-switched network, or any other suitable network.

Referring back to FIG. 1A, the computer can run a web browser or dedicated application and can be a traditional computer or a mobile computing platform, such as a mobile phone. The host server 104, policy server 106, and application server 108 can each be processes implemented on any suitable computing platform or multiple suitable computing platforms. For example, the host server 104 can be a web-based server accessible over the Internet that hosts the main web page for a particular service. The policy server 106 can be a server or a process for authenticating users and validating tokens. Policy servers 106 in an enterprise environment can be placed behind a firewall 110 to prevent unauthorized access. A policy server 106 can be implemented on the same physical hardware as the host server 104. A policy server 106 can also be configured to use a corporate Lightweight Directory Access Protocol (LDAP) directory or can incorporate an LDAP directory.

The policy server 106 can be configured to use secure communication protocols such as Internet Protocol security (IPsec), Secure Sockets Layer (SSL), Transport Layer Security (TLS), secure hypertext transfer protocol (HTTPS/1.1) or any other suitable encrypted protocol. Encryption can also be performed using a suitable type of cipher, including a private key cipher, a symmetric private key cipher, a public key cipher, and an elliptic curve cipher, among others. Specifically, encryption can be implemented using the Advanced Encryption Standard (AES), the Data Encryption Standard (DES), triple DES (3DES), or another suitable cipher. The application process 108 can be a web-based process, a dedicated application, or any other suitable computing process. The application process 108 can run on the same computing platform as the client 104 or host server 106, but can also be running on one or more separate computing platforms. For example, the application process 108 can be a process running on one or more networked computing platforms or a third party web-based process.

Figure 1C:
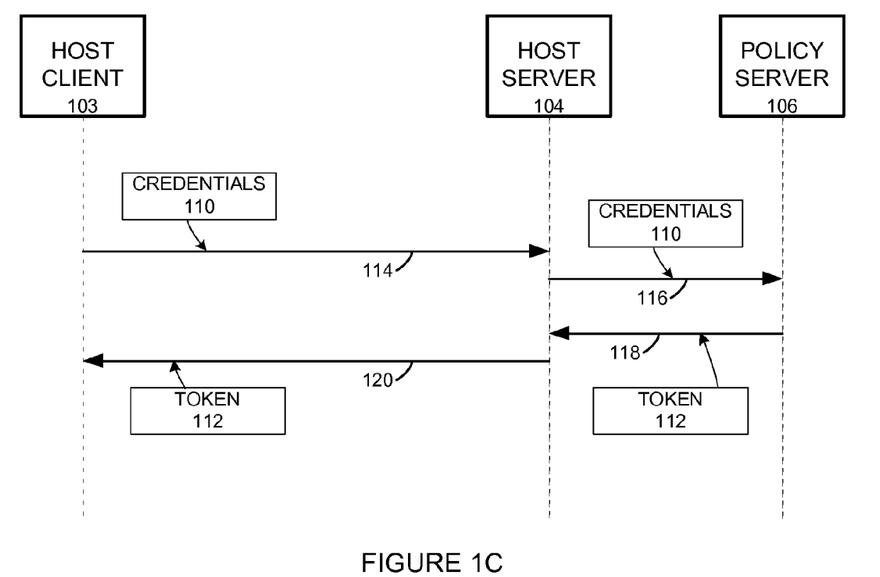
FIG. 1C is a flow diagram of the single sign-on system.
Figure 1D:
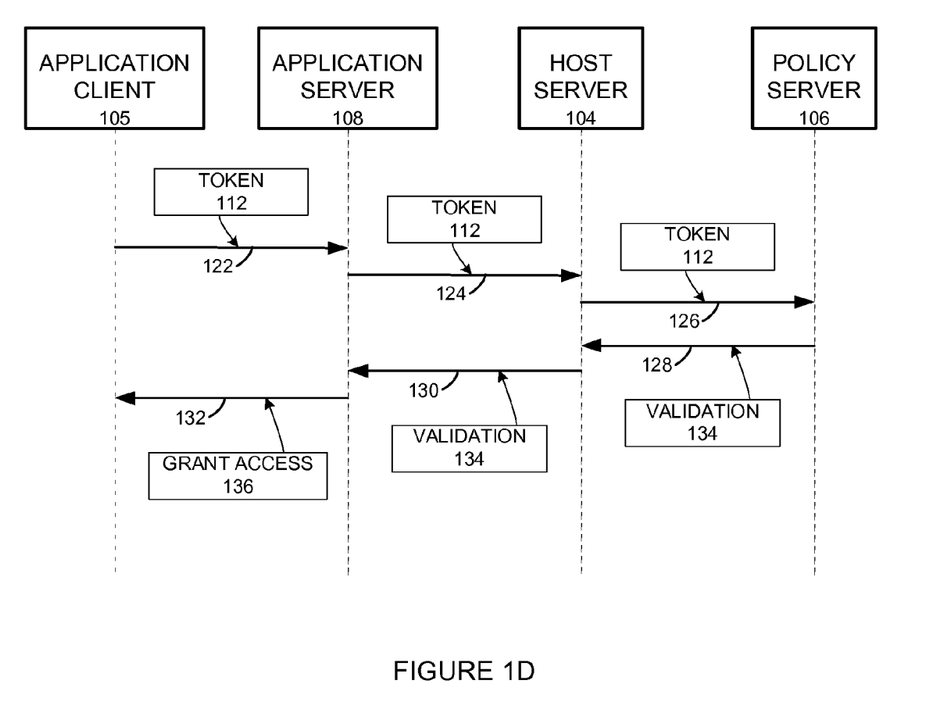
FIG. 1D is a flow diagram of the single sign-on system.

Referring now to FIGS. 1C and 1D, flow diagrams of a single sign-on system are presented. Referring to FIG. 1C, a computer implemented method of authenticating a host client 103 the SSO system 100 is presented. A host client 103 can establish a first communication channel with the host server 104. The host server 104 can request login or authentication credentials 110 from the host client 103, such as a username and password. Credentials can include characters, strings of characters, binary data, and certificates, or another suitable piece of information that can be used to authenticate identity or permissions of a user as is known in the art. The host client 103 can transmit the credentials 110 to the host server 104 over the first communications channel as shown by reference 114. The host server 104 can authenticate the credentials 110 by establishing a second communications channel with a policy server 106 and can transmit the credentials 110 to the policy server 106 as shown by reference 116. The policy server 106 can authenticate the credentials 110 of the host client 103, for example by checking the username and password of the user against a database of users and passwords. The communications channels can be secure communication protocols as described above and data can be encrypted. For example, the password can be sent as an encrypted hash of the password as is known in the art.

Once the policy server 106 has authenticated the credentials 110 of the host client 103, the policy server can transmit a token 112 back to the host server 104 as shown by reference 118. The token 112 can be a session token associated with both the successful authentication of the credentials 110 of the host client 103 and the communication session between the host server 104 and the policy server 106. The host server 104 can transmit the token 112 to the host client 103 as shown by reference 120. The host client 103 can pass the token 112 to other clients for single sign-in by application processes 108.

Referring to FIG. 1D, a computer implemented method for performing a single sign-on of an application client 107 with an application process 108 is presented. An application client 107 receives the token 112. The applicant client 107 can run on the same computer 102 as the host client 103. The host client 103 can pass the token 112 to the application client 107 using for example, the method described below with regards to the web browser 203, the plug-in 24, the cookie 214, and the session ID 212 illustrated in FIG. 2 and described in the accompanying specification, among other suitable methods of passing data between clients 103, 107. The application client 107 can establish a third communications channel with the application process 108. The application client 107 can transmit the token 112 to the application process 108 over the third communications channel as shown by reference 122. The application process 108 can establish a fourth communications channel with the host server 104 and transmit the token 112 to the host server 104 for validation as shown by reference 124. The host server 104 can transmit the token 112 to the policy server 106, as shown by reference 126, for example by establishing a new communications channel or by using the second communication channel described above for FIG. 1C. The policy server 106 validates the token 112 by comparing the token 112 with previously issued tokens 112. The policy server 106 can transmit a validation message 134 back to the host sever 104 as shown by reference 128. The validation message 134 can be any suitable data or message that indicates whether or not the token 112 is valid or associated with the host client 103 or session. The host server 104 can transmit a validation message 134 back to the application process 108 as shown by reference 130. The validation message 134 that the host server 104 transmits can be the same validation message 134 received from the policy server 106 as illustrated, or can be another suitable data or message.

The application process 108, upon receiving the validation message 134, can grant access to the application client 107 to computing resources associated with the application process 108 as shown by reference 136. For example, the application process 108 can transmit different web pages to the application client 107 based on the validation message 134 and the computing resources to which the application client 107 is granted access. For example, if the token 112 was successfully validated and the validation message 134 indicates the user is granted access, then the application process 108 can transmit a web page associated with the requested computing resources. But if the token 112 not successfully validated, or the if the user is not granted access to the requested computing resources based on the validation message 134, then the application process 108 can send a web page that requests further authentication of the user. Computing resources can include access to a local computer, a remote computer, a mobile computing device, a network management device, a device, a machine, a system, a software program, a process, a module, an application, a website, a file, a document, data, a database, a data store, and particular data within a data store, among other computing resources.

Figure 2:
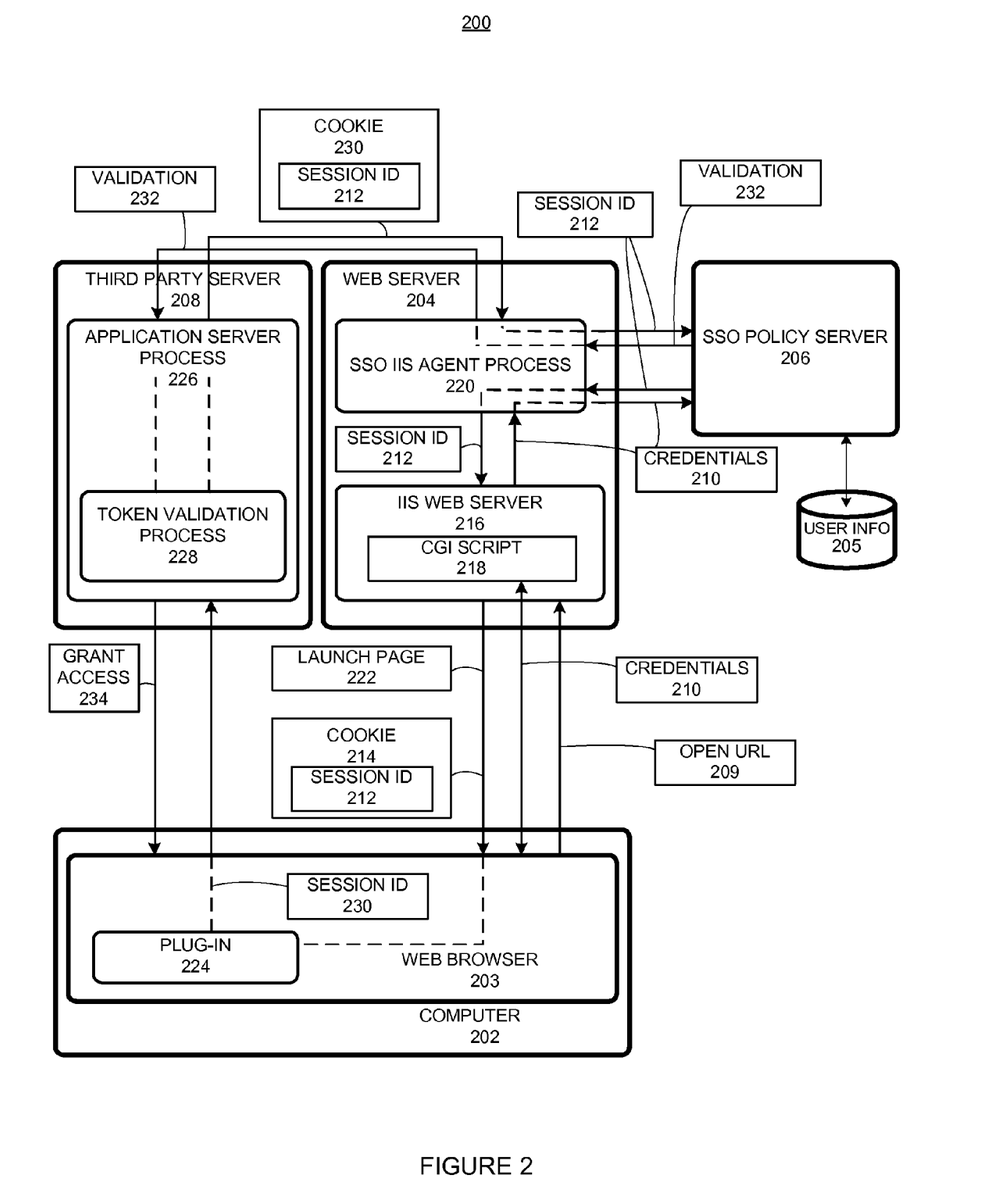
FIG. 2 is a block diagram of an exemplary single sign-on system.

Referring to FIG. 2, an exemplary SSO system 200 is presented. The SSO system 200 presented in FIG. 2 is an example implementation of the SSO system 100 illustrated in FIGS. 1A, 1B, 1C, and 1D and described above in the accompanying detailed description. The SSO system 200 can include a web browser 203 running on a computer 202 that is in communication with a web server 204. The web browser 203 can perform the functions of a host client 103, and the web server 204 can perform the functions of a host server 104. The web server 204 is in communication with a SSO policy server 206. SSO policy server 206 can be in communication with a data store 205 that is a repository of information about users and sessions.

In a computer implemented method for using the SSO system 200, a user can use a web browser 203 to navigate to a host web site on the web server 204 by entering a uniform resource locator, or URL 209, into the address bar of the web browser 203. The web browser 203 and the web server 204 can exchange messages using the hypertext transfer protocol, or HTTP, as is known in the art. On the web server 204, an Internet Information Services web server application, or IIS web server 216, can authenticate the user of the web browser 203 using, for example, a Common Gateway Interface script, or CGI script 218. The CGI script 218 requests user login credentials 210 from the user on the web browser 203. The CGI script 218 can be JavaScript or another suitable script. The CGI script 218 can transmit the user login credentials 210 to the IIS web server 216. The IIS web server 216 can transmit the user login credentials 210 to an SSO IIS agent process 220 on the web server 204 for authentication with the SSO policy server 206. The SSO IIS agent process 220 can transmit the user login credentials 210 to the SSO policy server 206. The SSO IIS agent process 220 can use a secure communication channel to communicate with the SSO policy server 206. Processes can be implemented in any suitable script, or programming language, including C, C++, Java, and C#, among others.

The SSO policy server 206 can authenticate the user login credentials 210 by performing a lookup operation on the data store 205. The data store 205 can be a local database on the SSO policy server 206, or can be an enterprise directory services accessible using, for example, the Lightweight Directory Access Protocol or LDAP. After the SSO policy server 206 authenticates the user login credentials 210, the SSO policy server 206 can transmit a token, or session ID 212, to the SSO IIS agent process 220.

The session ID 212 is used to authenticate the user on the web browser 203 for subsequent "sign-ons" to other applications, such as an application server process 226. The session ID 212 can be a token associated with a successful authentication of the user login credentials 210 and can be further associated with the session between the SSO IIS agent process 220 and the SSO policy server 206. Session information can include information regarding the logical session, for example layer 5 of the Open Systems Interconnection (OSI) model, or can include network or transport information, for example layers 3 and 4 respectively of the OSI model. Communications using other layers or combinations of layers can be used as known in the art.

The SSO IIS agent process 220 can transmit the session ID 212 to the IIS Web Server 216. The IIS web server 216 can transmit the session ID 212 to the web browser 203. For example, the IIS web server 216 can encapsulate the session ID 212 in a cookie 214, such as an HTTP cookie, and transmit the cookie to the web browser 203. The IIS web server 216 can transmit a launch page 222 to the web browser 203 that initiates communications with a third party server 208 that includes an application server process 226.

The web browser 203 can receive the launch page 222 and the cookie 214 that includes the session ID 212. The launch page 222 can include JavaScript that extracts the session ID 212 from the cookie 214 and passes the session ID 212 to a helper application, such as a plug-in 224. The plug-in 224 can perform the operations of an application client 107 illustrated in FIG. 1D and described in the accompanying specification above. The web browser 203 can be configured to allow JavaScript and accept cookies. The session ID 212 can be passed in a parameter list to the plug-in 224. The plug-in 224 can establish a communications channel with an application server process 226. The application server process 226 can be a process on the third party server 208 as shown. The application server process 226 can also be a process on a local server such as a server within an enterprise network associated with the web server 204 and policy server 206. The term third party server 208 is not meant to reflect separate ownership, although in typical use the third party server 208 can be a separate application server accessible over the Internet. The application server process 226 can include computing resources that the user on the web browser 203 desires to access, for example computing resources associated with a social network, a financial service, or an enterprise server. The plug-in 224 can transmit the session ID 212 to the application server process 226. The session ID 212 can be used by the application server process 226 to authenticate the user on the web browser 203.

For the user on the web browser 203 to be granted access to computing resources of the application server process 226, the application server process 226 can authenticate the user using the session ID 212, instead of, for example, requiring login credentials from the user. The application server process 226 can transmit the session ID 212 to a token validation process 228 associated with the application server process 226. The token validation process 228 can transmit the session ID 212 to the SSO IIS agent process 220 that previously authenticated the user login credentials 210 with the SSO policy server 206. The token validation process 228 can transmit the session ID 212 to the SSO IIS agent process 220 by encapsulating the session ID 212 in a cookie 230. For example, the SSO IIS agent process 220 can respond to an HTTP Get request that includes the cookie 230 with the encapsulated session ID 212, with validation response and user info such as name, user groups, and so forth in the response headers. The token validation process 228 can also call an existing interface on the SSO IIS agent process 220 in a similar way that the IIS web server 216 authenticated the user as described above for the host client 103 or web browser 203. Information can be passed between the token validation process 228 and SSO IIS agent process 220 in the response headers, or scripts and other mechanisms can be implemented to extract information from the body of the response. In this way, the token validation process 228 behaves as a host client 103 or web browser 203, and therefore would require minimal modifications, or possibly no modifications, to the validation interface of an existing host server 104 to integrate this solution into an existing system.

Figure 3:
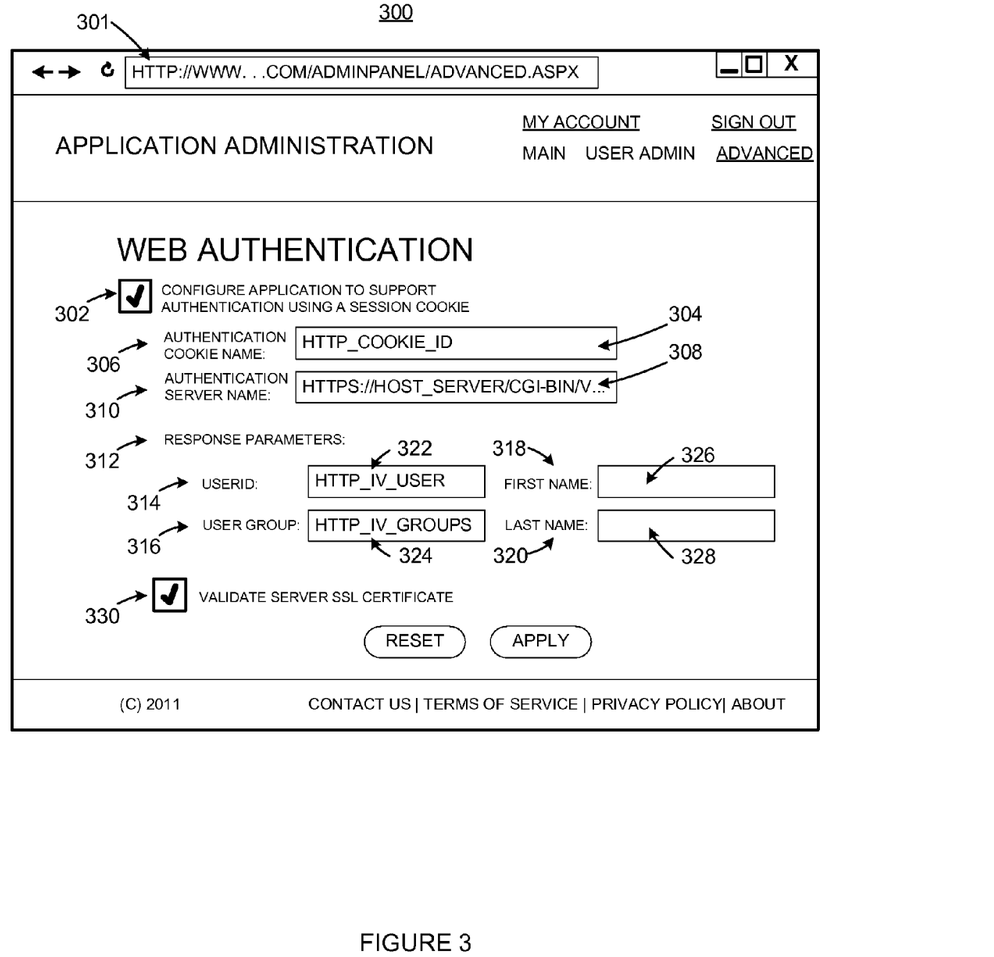
FIG. 3 is a block diagram of an example configuration screen for configuring communication between an application process and a host process.

Referring now also to FIG. 3, an example configuration screen 300 for configuring the token validation process 228 to send a cookie 230 to the SSO IIS agent process 220 is presented. The initial uniform resource locator, or configuration screen URL 301, that is used to access the configuration screen 300 is illustrated with a truncated URL but can be any suitable URL. A first check box 302 selects whether the token validation process 228 can send the session ID 212 to the SSO IIS agent process 220 by encapsulating the session ID 212 in a cookie 230. The cookie name 304 can be entered in a first text box 306. An example cookie name 304 is "HTTP_COOKIE_ID". The SSO IIS agent process 220 would be configured to extract the token from the cookie 230 named "HTTP_COOKIE_ID". The uniform resource locator, or URL 308, can be entered in a second text box 320.

Additional information for authenticating the user and validating the session ID 212, such as response parameters 312, can be included in communications between the token validation process 228 and the SSO IIS agent process 220, between the web browser 203 and the SSO IIS agent process 220, and between the SSO IIS agent process 220 and the SSO policy server 206. Example response parameters 312 can include a user ID 322, a user group 324, a first name 326 of the user, and a last name 328 of the user. The response parameters 312 can be entered into text boxes 314, 316, 318, and 320 in the configuration screen 300. One or more of the response parameters 312 can be obtained from the user of the web browser 203. For example, a servlet, such as a .Net/ASP/CGI/servlet as would be known in the art, can return one or more of the response parameters 312 from the web browser 203 to the requesting SSO IIS agent process 220 or application server process 226. The response parameters 312 can be used in the SSO system 200 to determine the user's privileges in the application server process 226, in addition to authenticating a user on the web browser 203 using single sign-on. In a configuration, one or more additional URLs 308 can be used to determine user privileges, for example to access other information on the policy server 106 or to access information on another server. This information can be used to determine whether the user has permission to access to a particular computing resource. Additionally, the communications can be encrypted using a secure socket layer certificate, or SSL certificate, by selecting a second check box 330. For example, communications between the token validation process 228 and the SSO IIS agent process 220 can be encrypted using an SSL certificate as is known in the art.

Referring back to FIG. 2, the SSO IIS agent process 220 can receive the session ID 212 from the token validation process 228, for example by extracting the session ID 212 from the cookie 230. The SSO IIS agent process 220 can transmit the session ID 212 to the SSO policy server 206 for validation. The SSO policy server 206 can validate the session ID 212 by comparing it to information related to the previous authentication of the user on the web browser 203, for example by comparing that the session ID 212 received from the SSO IIS agent process 220 has the same value as the session ID 212 previously sent to the SSO II agent process 220. The SSO policy server 206 can transmit a validation 232 message back to SSO II agent process 220, and the SSO II agent process 220 can send the validation 232 message back to the token validation process 228 to indicate whether or not the session ID 212 was successfully validated. The application server process 226 can grant the user access 234 to computing resources appropriate for the user on the browser 203, based at least in part on the successfully validation of the session ID 212 by the SSO policy server 206. The validation of the session ID 212 by the SSO policy server 206 authenticates the user on the web browser 203 for single sign-on.

There are several benefits to authenticating the client and validating the token through the SSO IIS agent process 220 (or a host server 104 of FIG. 1). A first benefit is that the policy server 106 can receive both the initial request to authenticate the user, and the later requests to validate the session ID 212 (or the token 112 of FIG. 1) from the same server. This is beneficial because it removes some constraints on placement of the application server process 226 (or application process 108 of FIG. 1). An SSO policy server 206 (or the policy server 106 of FIG. 1) can be behind an enterprise firewall, and therefore can be inaccessible to an application server process 226 (or application process 108 of FIG. 1) if access is blocked by the firewall. An SSO policy server 206 (or the policy server 106 of FIG. 1) can be configured to reject a session ID 212 (or a token 112 of FIG. 1) for sessions that do not originate from the same network or domain as the original session that was used to authenticate the user.

Another feature of the described SSO system 100, 200, is that once the user has performed a single sign-on using a session ID 212 (or a token 112 of FIG. 1), the user will not be automatically logged out of an application server process 226 (or application process 108 of FIG. 1) if that user's permission is changed, if an account deletion occurs, if an account disablement occurs, or if the user logs out of another SSO session. This is because the session ID 212 (or a token 112 of FIG. 1) remains valid until it expires. Unless the application server process 226 (or application process 108 of FIG. 1) checks with the SSO policy server 206 (or the policy server 106 of FIG. 1), or receives a subsequent message from the SSO IIS agent process 220 (or a host server 104 of FIG. 1), the user can retain their access privileges.

Although the SSO system 200 is described above in terms of cookies, JavaScript, plug-ins, launch pages, servlets, secure socket layer and SSL certificates, and various processes, modules, servers, and so forth, it should be understood that this is only one configuration of an SSO system 100. Other configurations of an SSO system 100, 200 are possible using these and other elements as would be recognized by those skilled in the art.

Figure 4:
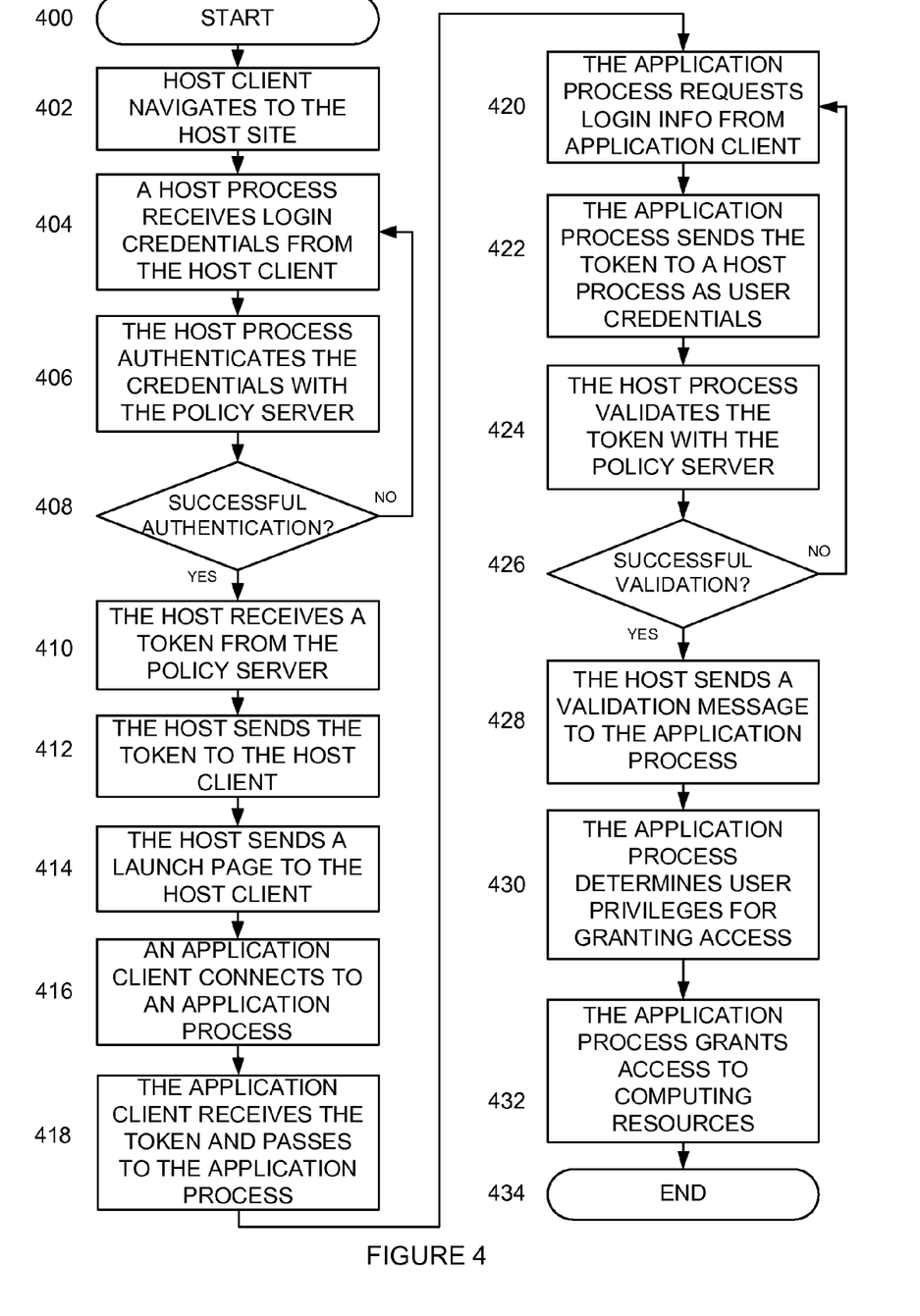
FIG. 4 is a flow diagram of a method for single sign-on using a client, a host process, an application process, and a policy server.

Referring now to FIG. 4, a flowchart of the operation of an SSO system 100, 200 is presented. Operation starts with start block 400 labeled START. Processing continues to process block 402 where a user uses a web browser to navigate to a host site, for example the main page for a particular service on a network. The host site can present a page to the user on the web browser using, for example, the HTTP protocol. The host site can present a page to the user that requests login credentials from the user using a CGI script. The web browser performs the operations of a host client 103 as described above. Processing continues to process block 404.

In process block 404, a host process on the host site receives the login credentials from the user's web browser interface. For example, a CGI script can request the user to enter their login name and password and hit an enter command to send the login credentials to the host site. The login credentials are then received by the host process. The login credentials can also include additional information about the user, such as their first name, their last name, their user group, data from a hardware authentication device, among other information. Processing continues to process block 406.

In process block 406, the host process authenticates the user's login credentials by sending them to a policy server. The policy server authenticates the login credentials and the policy server sends a message to the host process that indicates whether the user has been successfully authenticated using the login credentials. Processing continues to decision block 408.

In decision block 408, if the user is not authenticated, then processing continues back to 404 and the host process receives new login credentials from the user. If the user is authenticated successfully, then processing continues to process block 410.

In process block 410, the host process receives a message from the policy server that indicates that the policy server was able to authenticate the user successfully. The message can include a token, such as a session ID, that is associated with the successful authentication. In various configurations, the message can be the token, a message and the token sent separately, and a message that includes the token in the message. Processing continues to process block 412.

In process block 412, the host server sends the token to the host client process, or web browser. The host server can send the token to the host client process, or web browser, by encapsulating the token in a cookie and sending the cookie to the host client process. Processing continues to process block 414.

In process block 414, the host server optionally sends a launch page to the host client process. The launch page can include JavaScript that is configured to extract the token from the cookie and pass the cookie to a plug-in application, for example as parameter data. Process blocks 412 and 414 can occur simultaneously or consecutively. Processing in the other processing blocks can also occur simultaneously, consecutively, or in a different order than presented where appropriate. Processing continues to process block 416.

In process block 416, the plug-in application performs the operations associated with an application client 107. The plug-in application and connects to an application process, for example by attempting to access a particular service on an application server. The plug-in application can be launched by the JavaScript in the launch page. Processing continues to process block 418.

In process block 418, the plug-in application transmits the token to the application process. The token can be passed to the plug-in application when it is started by the JavaScript in the launch page. The token can be queried by the plug-in application and extracted from the cookie that was received by the host client process. Processing continues to process block 420.

In process block 420, the application process can request additional user information from the plug-in application. For example, the application process can request user information such as the user's first name, the user's last name, the user's user group, among other information. A process such as a servlet associated with the plug-in application or host client process, can automatically respond to the application process with the user information to implement a seamless single sign-on system. This user information can be used for logging in the user or to determine whether the user has permission to use a requested computing resource. Processing continues to process block 422.

In process block 422, the application process sends the token to a host process that can include the host process that originally authenticated the user. The token can be encapsulated in an HTTP cookie and transmitted to the host process. The application process can also include any of the additional login information from process block 420 with the token in the cookie. Processing continues to process block 424.

In process block 424, the host process validates the token by transmitting the token to the policy server. The host process can use a secure communication channel, for example by encrypting the communications, or a physically secure communications link, or other suitable secure communications as would be known or understood in the art. The policy server validates the token, for example by comparing the token with a previously issued token associated with the previous authentication of the user. The policy server sends a message to the host process that indicates whether the token was validated. Processing continues to decision block 426.

In decision block 426, if the token was not successfully validated, then processing continues back to process block 420 and additional login credentials are requested from the user. If the token was successfully validated, then processing continues to process block 428.

In process block 428, the host sends a message to the application process that indicates that the token was successfully validated. The message can be the same message that the host received from the policy server in process block 424, or a different message, for example a message that includes both an indication of a successful validation of the token and user permissions. Processing continues to process block 430.

In process block 430, the application process determines the user privileges available to the user. In a configuration, the application process can determine whether to grant the user access to computing resources based solely on the validation of the token. In a configuration, the application process can determine whether to grant the user access to particular computing resources based on a combination of the successful validation of the token and the additional login information provided in process block 420 or information provided in the message from the host in process block 428. Processing continues to process block 430.

In process block 432, the application process grants permission to computing resources based at least in part on the successful validation of the token by the policy server. Processing terminates at end block 432 labeled END.

The above descriptions of various components and methods are intended to illustrate specific examples and describe certain ways of implementing a single sign-on (SSO) system 100, 200 as disclosed and described here. These descriptions are neither intended to be nor should be taken as an exhaustive list of the possible ways in which these systems and modules can be made and used. A number of modifications, including substitutions of systems and modules between or among examples and variations among combinations can be made. Those modifications and variations should be apparent to those of ordinary skill in this area after having read this document.

What is claimed is:

1. A method of performing a single sign-on in a network comprising a client system, a host system and a credentialing server said method comprising:
   opening a first communications channel between a client system and a host system regarding a first process;
   opening a second communications channel between said host system and a credentialing server;
   authenticating credentials of said client system by said host system by;
      transmitting said credentials to said credentialing server; and
      receiving an authentication token from said credentialing server;
   sending said authentication token to said client system;
   opening a third communications channel between said client system and a second process;
   transmitting said authentication token to said second process;

opening a fourth communications channel between said second process and said host system;

transmitting said authentication token from said second process to said host system;

transmitting said authentication token from said host system to said credentialing server;

validating said authentication token by said credentialing server; and receiving a validation of said authentication token from said credentialing server that indicates that said token is associated with said previous successful authentication of said client system by said credentialing server; and selectively granting access to said client system so said second process based at least in part upon said validation of said authentication token.

2. The method of claim 1, wherein sending said authentication token to said second process comprises sending a cookie that includes said authentication token.

3. The method of claim 1, wherein at least one of sending said authentication token to said host system and sending said authentication token to said credentialing server comprises using a secure communications channel.

4. The method of claim 1, wherein said credentials comprise a user ID, a user group, a first name, and a last name.

5. The method of claim 1, further comprising:
sending, by said host system, a launch page associated with said first process to said client system.

6. The method of claim 5, wherein sending said authentication token to said client system comprises sending a cookie that includes said authentication token.

7. The method of claim 5, further comprising:
passing, by said client system, said authentication token as parameter data to a plug-in that communicates with the first process.

* * * * *